(12) United States Patent
Leutgeb et al.

(10) Patent No.: US 11,977,646 B2
(45) Date of Patent: May 7, 2024

(54) SECURE SENSOR ARRANGEMENT (71) Applicant: Infineon Technologies AG, Neubiberg (DE)

(72) Inventors: Thomas Leutgeb, Lieboch (AT); Markus Dielacher, Graz (AT); Norbert Druml, Graz (AT); Armin Krieg, Graz (AT)

(73) Assignee: Infineon Technologies AG, Neubiberg (DE)

( * ) Notice: Subject to any disclaimer, the term of this patent is extended or adjusted under 35 U.S.C. 154(b) by 779 days.

(21) Appl. No.: 16/793,475

(22) Filed: Feb. 18, 2020

(65) Prior Publication Data

US 2020/0265149 A1 Aug. 20, 2020

(30) Foreign Application Priority Data

Feb. 15, 2019 (DE) .......................... 102019202083.6

(51) Int. Cl.
*G06F 21/60* (2013.01)
*G01D 11/00* (2006.01)

(52) U.S. Cl.
CPC ........... *G06F 21/606* (2013.01); *G01D 11/00* (2013.01)

(58) Field of Classification Search
CPC .............................. G06F 21/606; G01D 11/00
USPC ........................................................ 702/189
See application file for complete search history.

(56) References Cited

U.S. PATENT DOCUMENTS

| | | | |
|---|---|---|---|
| 9,454,648 B1 * | 9/2016 | Philpott ................. | G06F 21/10 |
| 9,473,941 B1 | 10/2016 | Palin et al. | |
| 11,776,053 B2 * | 10/2023 | Radulescu ............ | H04J 3/0641 |
| | | | 709/201 |
| 2004/0039914 A1 * | 2/2004 | Barr ....................... | G06T 1/0071 |
| | | | 713/176 |
| 2006/0161791 A1 * | 7/2006 | Bennett ................. | G06F 21/40 |
| | | | 713/193 |
| 2014/0201094 A1 * | 7/2014 | Herrington ............ | G06V 20/80 |
| | | | 705/317 |
| 2017/0345116 A1 | 11/2017 | Katoh | |
| 2018/0089789 A1 | 3/2018 | Derakhshani | |
| 2018/0295137 A1 * | 10/2018 | Zager ................... | H04L 63/0861 |
| 2020/0111107 A1 * | 4/2020 | Herrington ........... | G06Q 30/018 |

\* cited by examiner

*Primary Examiner* — Aditya S Bhat (74) *Attorney, Agent, or Firm* — COOPER LEGAL GROUP, LLC (57) ABSTRACT

A sensor arrangement comprises a communication device and a sensor element. The sensor element is configured to record a property and provide a sensor signal that represents the property. The sensor arrangement comprises a security element configured to provide a secret. The sensor arrangement is configured to link the sensor signal to the secret to obtain a linked sensor signal, transmit the linked sensor signal to a communication partner using the communication device, obtain a test signal from the communication partner using the communication device, and perform a check to determine whether the test signal comprises the secret.

21 Claims, 9 Drawing Sheets

Fig. 9

SECURE SENSOR ARRANGEMENT

RELATED APPLICATION

This application claims priority to German Patent Application No. 102019202083.6, filed on Feb. 15, 2019, entitled "Sichere Sensoranordnung", which is incorporated by reference herein in its entirety.

SUMMARY

The present disclosure relates to a sensor arrangement that is configured to link a sensor signal to a secret, and to a method for linking a sensor signal to a secret. The present disclosure furthermore relates to embedding watermarks into 3D sensor data.

Sensors are used to record a number of properties, that is to say physical values or patterns. These include both measured data, for instance for temperatures, magnetic fields, electrical characteristic variables, positions or the like, and sensors for recording biometric data, for example fingerprint sensors or other sensors, for example microphones or the like.

Sensor arrangements that provide a high level of security, such as in terms of counterfeit protection, would be desirable.

One exemplary embodiment provides a sensor arrangement comprising a communication device and a sensor element configured to record a property and to provide a sensor signal that represents the property. The sensor arrangement comprises a security element that is configured to provide a secret. The sensor arrangement is configured to link the sensor signal to the secret to obtain a linked sensor signal, transmit the linked sensor signal to a communication partner using the communication device, obtain a test signal from the communication partner using the communication device, and perform a check to determine whether the test signal comprises the secret. This makes it possible to use the sensor arrangement to provide an authentic sensor signal and to check whether the obtained test signal is likewise authentic, since both the provision of the secret and the check thereon are performed by the sensor arrangement. This allows a high level of security.

According to one exemplary embodiment, a method comprises recording a biometric property using a sensor element to obtain a sensor signal that represents the property. The method comprises linking the sensor signal to a secret to obtain a linked sensor signal. The linked sensor signal is transmitted to a communication partner. A test signal is obtained from the communication partner. The method comprises checking whether the test signal comprises the secret.

DESCRIPTION OF THE DRAWINGS

Exemplary embodiments are explained below with reference to the accompanying drawings. In the figures:

FIG. 4b shows a schematic illustration of amplitude information of the three-dimensional scene, obtained according to the exemplary embodiment from FIG. 4a;

DETAILED DESCRIPTION

Before exemplary embodiments are explained in more detail below with reference to the drawings, it is pointed out that identical, functionally identical and/or identically acting elements, objects and/or structures are provided with the same reference signs in the various figures such that the description of these elements set forth in the various exemplary embodiments may be interchanged with one another or applied to one another.

The following exemplary embodiments relate to sensor arrangements comprising a sensor element that is configured to record a property. A property in connection with the exemplary embodiments described in this document is understood to mean one or more physical values, for instance measured data from the field of temperatures, magnetic fields, electrical characteristic variables, positions, biometric data, microphones and/or other sensors. This property may be recorded in the form of a sensor value, a temporal sequence of sensor values and/or a spatial and/or temporal pattern of sensor values. A sensor signal provided by the sensor element may represent the property, for example in the form of two-dimensional and/or three-dimensional image data, as is possible for example for fingerprint sensors, as an audio signal and/or as a temporal sequence of amplitudes and/or phase values.

Figure 1:
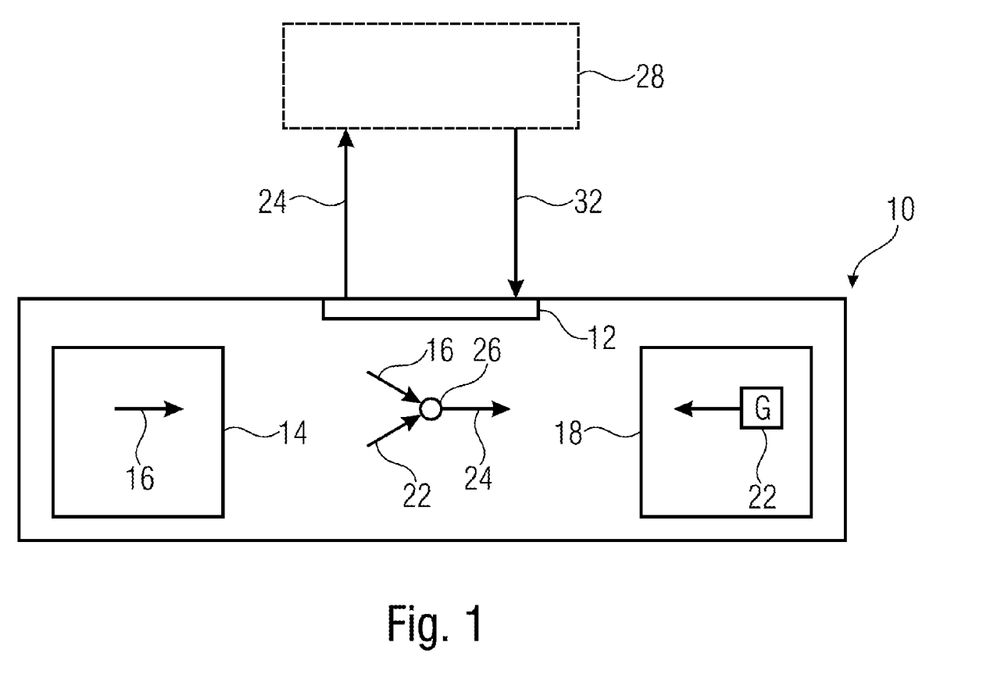
FIG. 1 shows a schematic block diagram of a sensor arrangement according to one exemplary embodiment.

FIG. 1 shows a schematic block diagram of a sensor arrangement 10 according to one exemplary embodiment. The sensor arrangement 10 comprises a communication device 12 that is designed and/or configured to exchange signals with external communication partners in a wireless and/or wired manner. Wired communication may be achieved for example by way of a direct wired connection, for instance by the sensor arrangement 10 and an external communication partner being comprised in a common overall system, for example in mobile apparatuses, for instance mobile telephones and/or tablet computers. These examples are mentioned only to explain sensor systems that comply with the present disclosure. A corresponding sensor system may also readily be implemented in another way, such as implemented on a larger scale. One example of wireless communication is for example a direct radio connection, for example using direct connections, for instance Bluetooth® and/or other standards, wherein local area and/or wide area network connections may also readily be used. Interfaces for using different transmission methods and/or transmission standards may readily be combined in the communication device 12.

The sensor arrangement comprises a sensor element 14 for recording a property and for providing a sensor signal 16 that represents the property. The sensor signal may be provided such that the sensor signal 16 is provided directly and/or as raw data to another device and/or to another element or such that the sensor signal 16 is processed further within the sensor element 14 and the version of the sensor signal 16 obtained through the further processing is provided (and/or only the version of the sensor signal 16 obtained through the further processing is provided).

The sensor arrangement 10 furthermore comprises a security element that is configured to provide a secret 22 represented by "G". A security element is understood to mean a device that is designed and/or configured to perform particular operations and/or calculation procedures, and has access to a data memory for this purpose. By virtue of specific security measures, both the computational operations, the execution thereof and the data memory may be considered to be protected against external access, for instance by making it more difficult or impossible to reprogram the security element 18 by detecting mechanical access to signal lines and/or the data memory and responding to such a detected attack by performing corresponding countermeasures, for instance deleting data and/or the like, wherein other measures may also readily be taken. The security element 18 (or secure element) may in this regard be considered to be a trusted device.

The sensor arrangement 10 is designed and/or configured to link the sensor signal 16 to the secret 22 to obtain a linked sensor signal 24. The linked sensor signal 24 is preferably designed and/or configured such that the secret 22 is present in the linked sensor signal 24 in masked form (and/or such that the secret 22 is present in the linked sensor signal 24 only in masked form), that is to say not in plain text. In other words, the sensor signal 16 may be changed and/or distorted by the secret 22 to obtain the linked sensor signal 24. By way of example, this may be achieved through addition, subtraction, multiplication, division and/or another link, for instance a bijective link such as an XOR link (XOR=exclusive OR) performed on sensor values with other values of the secret. By way of example, the sensor signal 16 may be a spatial and/or temporal pattern of sensor information, for instance image information and/or audio information. The secret may comprise a secret pattern that is compatible with the sensor information, that is to say is able to be combined, for instance by changing a subset of individual elements of the spatial and/or temporal pattern and/or the entire pattern. The sensor arrangement may be designed and/or configured to overlay the pattern of sensor information with the secret pattern to obtain the linked sensor signal. At least one, a subset or all of the pixels and/or the like may thereby be changed by the secret pattern.

The link may make it possible to achieve a situation whereby it is difficult or impossible to reproduce the sensor values if the secret 22 is not known. As an alternative and/or in addition, the presence of the secret 22 in the combined sensor signal 24 is not readily able to be detected, that is to say the secret 22 is preferably not readily able to be extracted from the combined sensor signal 24. The corresponding link 26 may be performed in the sensor element 14, for instance when the secret 22 is transmitted to the sensor element 14, but may, as an alternative and/or in addition, also take place in the security element 18, for instance by transmitting the sensor signal 16 to the security element 18 or, as an alternative and/or in addition, may also be performed in another device that receives both the sensor signal 16 and the secret 22. The sensor arrangement 10 is in this case preferably a spatially adjacent arrangement, for example in the form of a secure biometric sensor in a mobile device.

The sensor arrangement 10 is configured to transmit the linked sensor signal 24 to an external communication partner 28 using the communication device 12. The communication partner 28 is in this respect external to the sensor arrangement 10 and is not a component thereof, but may form a sensor system together with the sensor arrangement 10. One example of an external communication partner 28 is for example an application processor that may be part of the same apparatus/system, but may also be reached, as an alternative and/or in addition, via a network connection. By way of example, the communication partner 28 may be designed and/or configured to perform a pattern extraction and/or data reduction from the provided data such that the communication partner 28 may also be a device shared by a plurality of sensor devices, considering the computational power to be provided.

The sensor arrangement 10 is designed and/or configured to receive a test signal 32 from the communication partner 28 using the communication device 12. It is pointed out that this means that the external communication partner 28 may also be a distributed device with a plurality of individual components and/or individual devices and that the linked sensor signal 24 may be transmitted to a first sub-device of the external communication partner 28 and the test signal may be received from a further, different device of the external communication partner 28. Examples of such divisions are user interfaces to which the linked sensor signal 24 is transmitted, whereas the test signal 32 may be received for example from an authentication unit and/or the like of the external communication partner 28.

The sensor arrangement 10 is designed and/or configured to perform a check as to whether the test signal 32 comprises the secret 22. A protocol, which is implemented for example jointly by the sensor arrangement 10 and the external communication partner 28, may thus make provision for the test signal 32 to be the linked sensor signal 24 in part or in full, that is to say it is obtained for example from the linked sensor signal 24 by way of a data reduction, a compression and/or a feature extraction. The test signal 32 may for example be the combined sensor signal 24 or a part thereof. For example, the test signal 32 be a part that was extracted based on a feature analysis and/or a pattern comparison, for example characteristic points and/or characteristic areas of biometric sensor data, for instance fingerprints and/or faces. It is possible for the test signal 32 to be derived from the linked sensor signal 24 in a predefined manner. In this respect, the secret 22 comprised in the linked sensor signal may also be comprised in the test signal 32. The check as to whether the test signal 32 comprises the secret 22 may therefore make it possible to draw conclusions as to whether the test signal 32 was provided by the sensor arrangement 10, that is to say is authentic. In the event of manipulation, a data change and/or another malicious attack, the secret 22 would not be implemented and/or would be implemented in manipulated form in the test signal 32, this being able to be identified by the check. Returning to the example of the biometric sensor, it would for example be possible to identify attacks in which an attempt is made to copy biometric patterns, for instance a fingerprint. These could be used to request processes and/or services that require high security, such as with regard to financial transactions. Even if an attacker then manages to transmit a corresponding signal comprising the possibly correct fingerprint to the external communication partner 28, then the check of the test signal 32 at the latest would reveal that the secret 22 is not implemented, such that the attack is able to be repelled.

The security element 18 is preferably designed and/or configured to check the test signal 32 as to whether it comprises the secret 22. One advantage of this is that the secret 22 is not transmitted to other devices in plain text.

Exemplary embodiments make provision for a result of the check to be communicated to the communication partner 28. This may be used for example to authorize actions, services and/or the like possibly requested by the external communication partner 28, and/or to block them if necessary.

Figure 2:
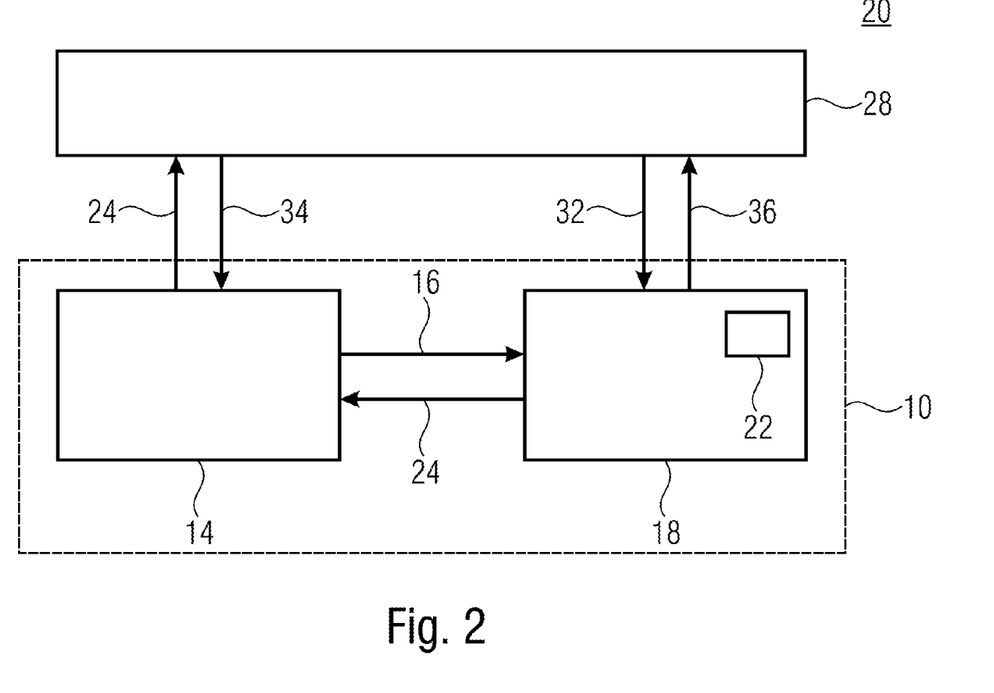
FIG. 2 shows a schematic block diagram of a sensor system according to one exemplary embodiment.

FIG. 2 shows a schematic block diagram of a sensor system 20 according to one exemplary embodiment. The sensor system 20 comprises for example the sensor arrangement 10, in which the sensor element 14 is designed and/or configured for example as a biometric sensor. The security element 18 provides a highly secure environment. The external communication partner 28 comprises for example an application processor, for instance high-performance environments for executing applications (high performance execution and environment). The external communication partner 28 is in this respect designed and/or configured to use the linked sensor signal 24. The test signal 32 may be a part of the linked sensor signal 24, may be the linked sensor signal 24 and/or may be derived from the linked sensor signal 24 in a predefined manner.

Although other implementations are also possible, the sensor system 20 is illustrated such that the linked sensor signal 24 is provided by the sensor element 14, for instance after a corresponding request has been received by the sensor arrangement 10. For this purpose, the communication partner 28 may for example send a signal to the sensor arrangement 10, which is received as input signal 34 by the sensor arrangement 10, for example the sensor element 14. In a manner triggered by this request, the sensor element 14 may for example record and/or measure the property, for example the fingerprint, and the sensor signal 16 may provide this to the security element 18, which links the sensor signal 16 to the secret 22. The linked sensor signal 24 may be transmitted back and/or provided to the sensor element 14 such that the linked sensor signal 24 is transmitted to the external communication partner 28 by the sensor element 14 in place of the undistorted sensor data.

The security element 18 may receive the test signal 32 and check whether the secret 22 is comprised in the test signal 32. This means that the security element 18 may have all the information required for the verification. A result of the check may be transmitted to the external communication partner 28 by way of a transmission signal. The transmission signal 36 may comprise both a positive and a negative result, wherein it may already be sufficient to transmit just one of the two, that is to say the positive result and/or the negative result, since the absence of corresponding information may be understood to be a complementary statement. Instead of the communication partner 28, the transmission signal 36 may also provide another device, for example a device that makes a decision about the access and/or the execution of further services, as receiver and be transmitted thereto, which also permits combinations and/or several receivers.

The security element 18 may be designed and/or configured to enable additional functions and/or to transmit information to the communication partner 28, for example, in the event of a positive result of the check, that is to say the check reveals that the test signal 32 comprises the secret 22. A corresponding function may thus comprise authorization to change data and/or corresponding information may, as an alternative and/or in addition, be transmitted in the transmission signal 36.

In other words, the security element 18, following a successful check, may perform actions such as for example enabling further, possibly security-relevant functions and/or releasing and/or transmitting information. The communication partner 28 may be designed and/or configured to perform corresponding actions. Irrespective of the additional functions and/or data, the external communication partner 28 may be configured to obtain the result of the check by way of the signal 36. Based on the result, the communication partner 28 is able to derive and/or determine whether content and/or a source of the linked sensor signal 24 is authentic, that is to say trusted, and/or whether the linked sensor signal has not been changed without permission.

In other words, the sensor 14 may transmit reference data 16 to the security element 18. The security element 18 may apply a secret 22 to the reference data and store the result, such as in a secure memory of the security element 18. The sensor 14 obtains the result from the security element 18 and integrates it into its data flow, for example into a 3D data flow. The application processor extracts a pattern and/or an excerpt from the received data flow and transmits it to the security element 18 for verification. The sensor system 20 comprises a high-performance application processor and a secure sensor device 10 comprising a biometric sensor 14 and a security element 18. Communication interfaces between the security element 18 and the sensor and its processor are likewise protected.

By virtue of storing the linked sensor signal 24 in the security element 18, it is possible to check the received test signal for the presence of the secret 22 without further communication with other modules.

In yet other words, the sensor element and/or the sensor receives a random watermark from the secure device and/or the secure element. The sensor applies the watermark to the sensor data, for instance using a steganography method. The application processor evaluates the sensor data, extracts characteristic properties (features) and generates the test signal 32 (candidate template) therefrom, which is transmitted to the secure device. The secure device extracts the watermark and verifies the correctness and compares the candidate template with references.

Reference is now made below to different designs of the sensor arrangement 10 and/or of the sensor system 20. Reference is made to options for manipulating the sensor signals to obtain the linked sensor signal 24.

Figure 3:
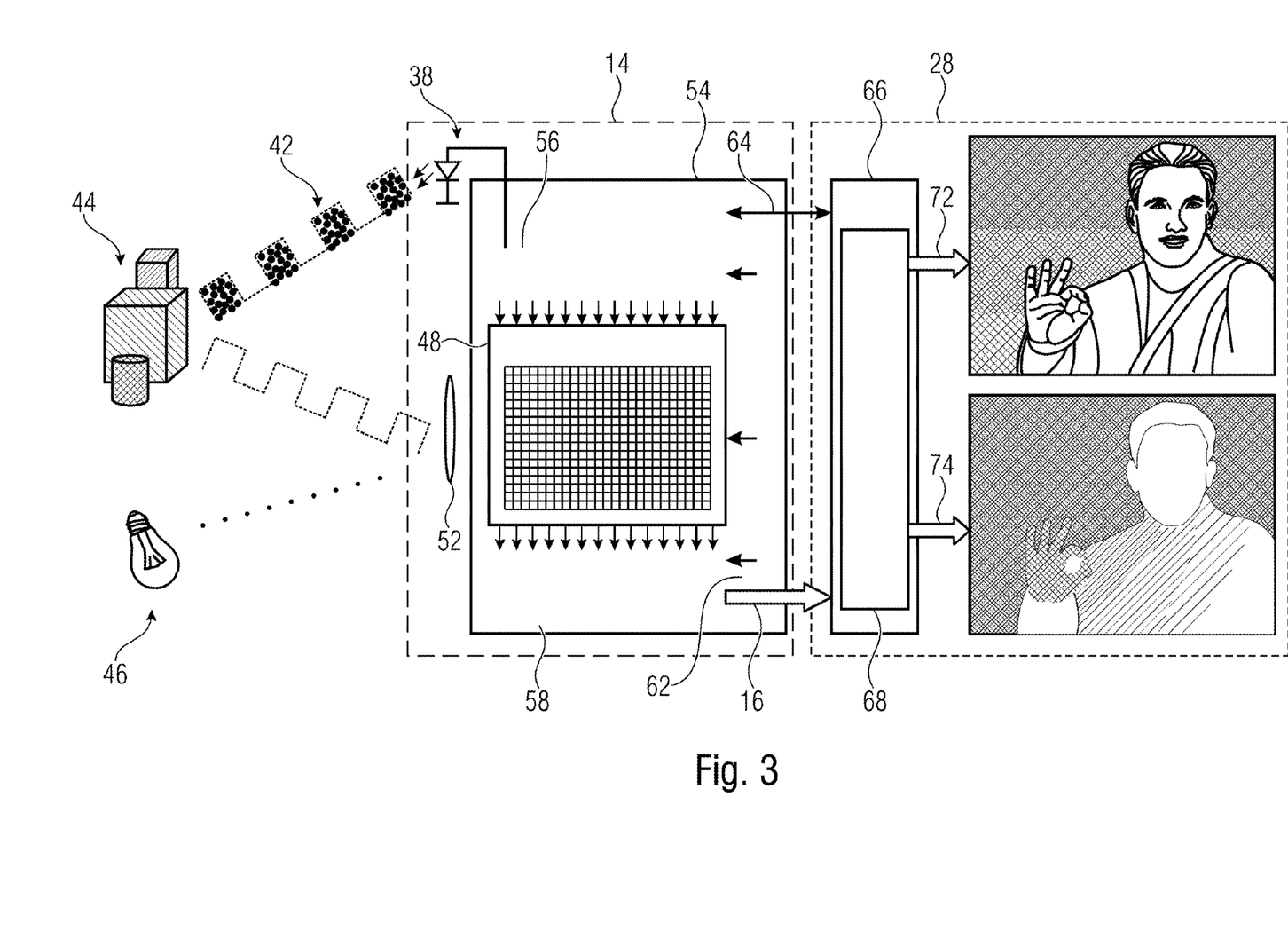
FIG. 3 shows a schematic block diagram of a possible design of the sensor system from FIG. 2, such as with regard to a sensor element thereof interacting with an external communication partner.

FIG. 3 shows a schematic block diagram of a possible design of the sensor system 20, such as with regard to the sensor element 14 interacting with the communication partner 28. The sensor element 14 may for example comprise and/or form a depth camera in which a light source configured for this purpose is designed and/or configured to transmit a light signal 42 to a three-dimensional scene 44, where it is reflected and, overlaid with background light 46, recorded by a pixel array 48, possibly using imaging optics and/or a lens 52. The light signal 42 may be a measured signal emitted for the measurement and on which the subsequent sensor signal 16 is based. The light source is for example active illumination with modulated infrared light. A phase offset that makes it possible to measure the distance in the time domain occurs between the emitted light and the received light. The depth map may in this respect have an amplitude-based image that may be applied for example as a quality indicator.

The controlling of the 3D image sensor 54 may comprise a modulation stage 56 that coordinates controlling of the light source 38 and sampling of the pixel array 48 with one another, wherein superordinate control, including of an analog-to-digital converter stage 58, may be implemented by a control device 62, wherein digitized data of the pixel array 48 may be provided as a sensor signal 16. These may be provided to the external communication partner 28, for instance when said communication partner sends a request using a control channel 64, by way of which for example the input signal 34 may be transmitted. A control device 66 of the external communication partner 28 may comprise a calculation device 68 that is configured, for example, to calculate amplitude information 72 and depth information and/or phase information 74, both of which may be part of an overall signal, by linking and/or combining a plurality of sensor signals 16.

Figure 4A:
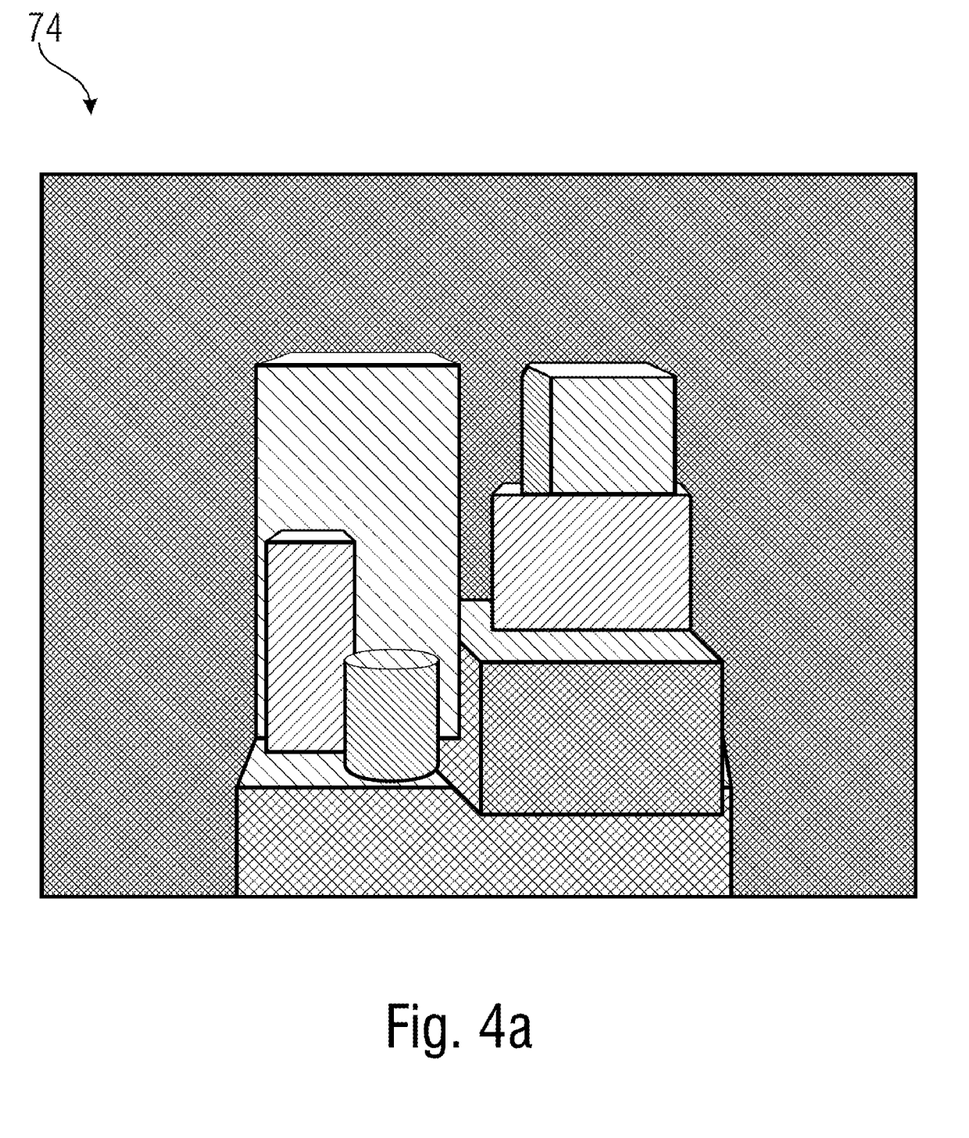
FIG. 4a shows a schematic illustration of depth information of a three-dimensional scene, obtained according to one exemplary embodiment.

FIG. 4a shows a schematic illustration of the depth information 74 of the three-dimensional scene 44, which may be obtained for example by linking sensor signals 16 whose respective light signals 42 are phase-offset from one another.

Figure 4B:
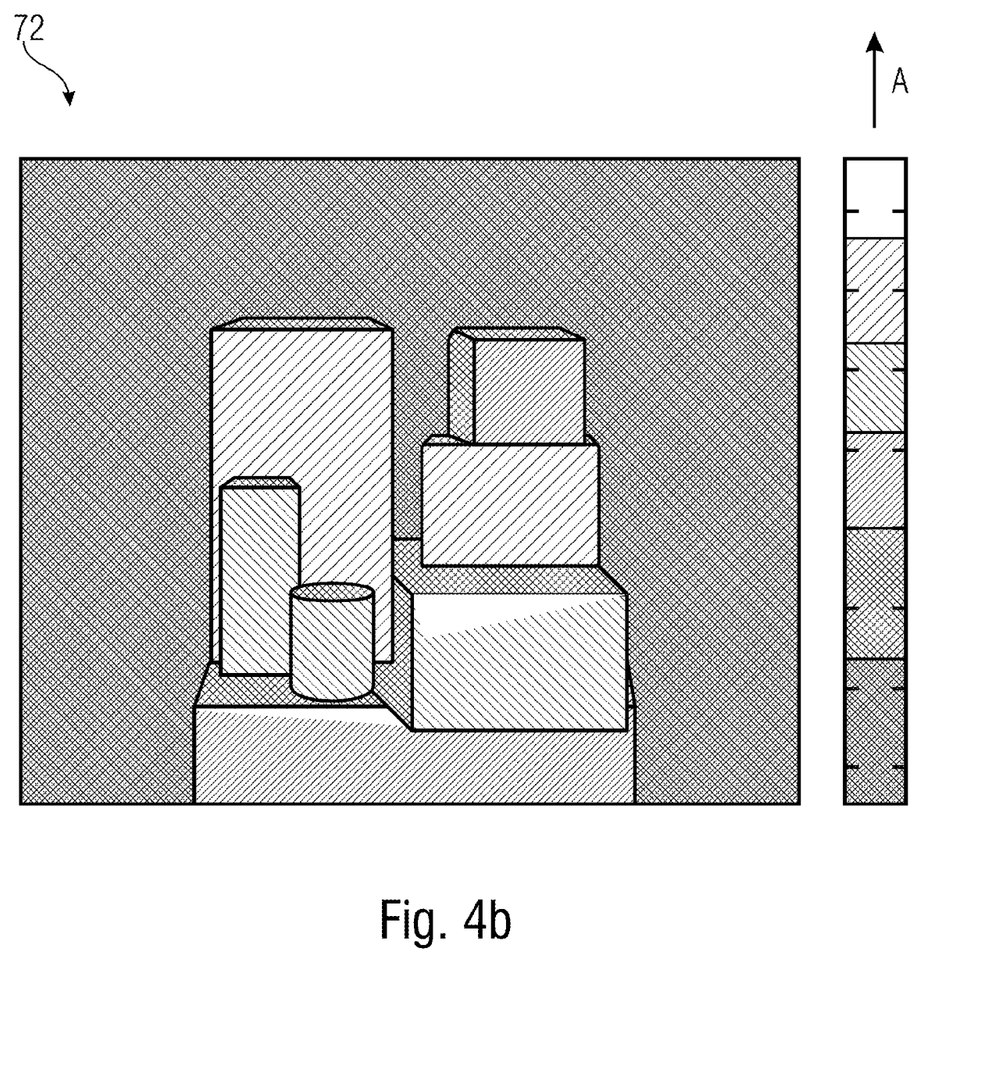

FIG. 4b shows a schematic illustration of the amplitude information 72 of the three-dimensional scene, in which the same signals are evaluated in terms of the amplitude A. A may also be referred to as the intensity of the reflected light, whereas the depth may be calculated from the phase information.

The sensor element may be designed and/or configured to record the property multiple times to provide a multiplicity of sensor signals. Combining the multiplicity of sensor signals may result in an overall signal to be evaluated, for instance the abovementioned amplitude information 72 and the depth information 74. The sensor arrangement 10 may be designed and/or configured such that linking to the secret results in a static offset error of the sensor element and/or could be perceived as such, such that, in the event of a corresponding combination, which is discussed below, this offset error is subtracted out and the secret 22 in the amplitude information 72 and the depth information 74 is subtracted out, whereas an individual sensor signal that may for example be transmitted to the sensor arrangement 10 as test signal 32 still comprises the secret for verification.

Figure 5A:
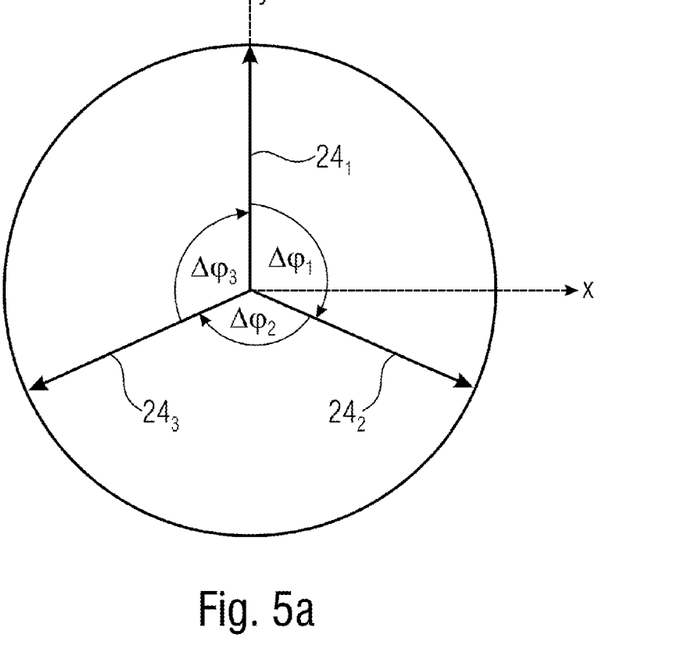
FIG. 5a shows a schematic graph in a two-dimensional Cartesian coordinate system in order to clarify the subtraction of a static offset error using three sensor values of the sensor element according to one exemplary embodiment.

FIG. 5a shows a schematic graph in a two-dimensional Cartesian coordinate system using an x-axis and a y-axis in order to explain the subtraction of the static offset error. By way of example, different linked sensor signals $24_1$, $24_2$ and $24_3$ may be obtained by manipulating, distorting and/or extending three sensor signals each comprising the same secret 22. By way of example, the underlying sensor signals may be obtained using measured signals, for instance light signals 42, that have a phase offset $\Delta\varphi_1$, $\Delta\varphi_2$ and $\Delta\varphi_3$ from one another. The phase spacings are preferably equidistant, that is to say within tolerance ranges, which are as small as possible, of ±5%, ±2% and/or ±1%, as far as possible 0%: it is the case that $\Delta\varphi_1=\Delta\varphi_2=\Delta\varphi_3$.

By combining the combined sensor signals $24_1$, $24_2$ and $24_3$ such that static offset errors of the sensor element are able to be compensated and/or eliminated, for example through addition in the shown example, the offset error, the secret 22, is removed in the obtained combination, whereas it is comprised in the individual signals. This means that the sensor element may emit a multiplicity of measured signals with a phase position different from one another. The sensor arrangement may be configured to insert the secret into each of the multiplicity of sensor signals such that linking the multiplicity of linked sensor signals $24_1$ to $24_3$ in accordance with a predetermined rule to form an overall signal to compensate the static offset error leads to the secret in the overall signal being eliminated, that is to say removed and/or subtracted out. Since the rule by way of which the overall signal, for example comprising the amplitude information 72 and the depth information 74, is generated is known both to the sensor arrangement 10 and to the external communication partner 28, this rule may be taken into consideration to eliminate and/or compensate the static offset error, the secret 22.

Figure 5B:
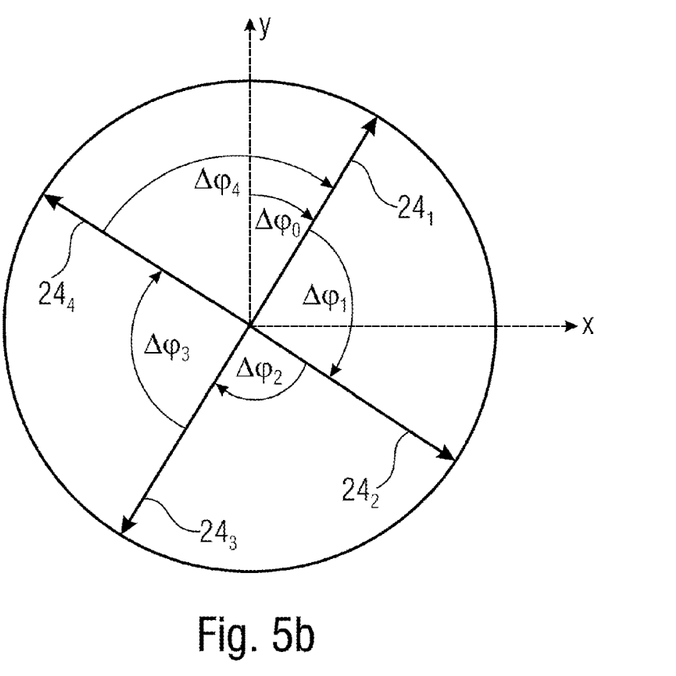
FIG. 5b shows a schematic graph in the two-dimensional Cartesian coordinate system, illustrating four linked sensor signals according to one exemplary embodiment.

FIG. 5b shows a schematic graph in the two-dimensional Cartesian coordinate system, illustrating four linked sensor signals $24_1$ to $24_4$ that are as far as possible offset equidistantly from one another by phase angles $\Delta\varphi_1$, $\Delta\varphi_2$, $\Delta\varphi_3$ and $\Delta\varphi_4$, which are identical within the abovementioned tolerance range, of in each case 90° from one another. With regard to a zero position, the first linked sensor signal $24_1$ of this phase sequence may have an offset of $\Delta\varphi_0$, which may be arbitrary, for example including zero. By linking the linked sensor signals $24_1$ and $24_3$ and/or $24_2$ and $24_4$ in pairs, static offset errors may for example already be compensated in pairs. In this configuration, it is, for example, possible for the symmetry criterion to be met in each case in pairs, for example by it being the case that $\Delta\varphi_1+\Delta\varphi_2=180°$ and $\Delta\varphi_2+\Delta\varphi_3=180°$. This means that it is also possible to dispense with an equidistant arrangement of all of the phase positions where possible, even though this offers advantages in terms of a robust evaluation.

It becomes clear that it is possible to use any other number of individual sensor signals and/or linked sensor signals as long as their regular combination is suitable for compensating static offset errors. By way of example, in addition to the described configuration with three or four sensor signals, even higher numbers, for example five, six or more, of sensor signals may be used.

With reference to the exemplary embodiment explained in connection with FIG. 5b, in which four sensor signals having a respective phase offset of $\Delta\varphi_1$, $\Delta\varphi_2$, $\Delta\varphi_3$ and $\Delta\varphi_4$ of in each case 90° are used and with reference to the configuration according to FIG. 3, that is to say the measured signal 42 has respectively the 90° phase offset, a description is given below of one exemplary link option for obtaining the amplitude information 72 and the depth information 74. According to this configuration, pairs of differences are considered (e.g., only pairs of differences are considered). In order to obtain the amplitude information 72, the following calculation rule may for example be taken as a basis:

$$A = \frac{\sqrt{(A_2 - A_4)^2 + (A_1 - A_3)^2}}{2}$$

In order to obtain the depth information and/or phase information 74, the following calculation rule may for example be used and/or taken as a basis:

$$\varphi = \arctan\left(\frac{A_2 - A_4}{A_1 - A_3}\right)$$

The four measured data may thus be combined using the arctan function to reconstruct the 3D data. This is however just one of the possible embodiments for reconstructing the response function of the sensor element that makes it possible to overcome static offsets by subtracting and/or dividing the phase information, and the exemplary embodiments are applicable to other correction systems that reduce and/or eliminate artefacts.

Such values for A and φ may be determined for example for a plurality of or even each of the pixels of an image pattern, such that corresponding values are able to be obtained for at least each functional pixel of the pixel array 48.

The signal φ may in this case be a first component of the overall signal that indicates phase information. A may be a second component of the overall signal that indicates amplitude information. $A_1$, $A_2$, $A_3$ and $A_4$ may denote the combined sensor signals. The combined sensor signals may have phase increments that are equidistant to one another. Referring again to FIG. 5b, if the value $\Delta\varphi_0$ is for example 0°, then it may also be the case that $A_1=A_0°, A_2=A_{90}°, A_3=A_{180}°$ and $A_4=A_{270}°$.

This link means that for example differences between pairs $A_2$ and $A_4$ as well as $A_1$ and $A_3$ are evaluated (and/or only differences between pairs $A_2$ and $A_4$ as well as $A_1$ and $A_3$ are evaluated). This makes it possible to add and/or subtract a value of the secret 22 without changing the result, the difference. This method of obtaining three-dimensional data may thus be utilized to transparently insert secrets into the data flow of the sensor element.

In other words, a 3D TOF (time-of-flight) provides sensor raw data for four different sampling times $A_0°, A_{90}°, A_{180}°$ and $A_{270}°$. The required phase data (φ) and grayscale amplitude data (A) may be calculated by applying the following equations:

As explained in connection with FIGS. 1 and 2, the sensor signals 16 may for example be transmitted to the security element 18, which manipulates the individual data by linking them to the secret to generate the static offset error, for example. These linked sensor data may again be provided to the sensor element 14, which then generates the data flow.

The communication partner 28, that is to say the device for using the linked sensor signal 24, may be designed and/or configured to obtain a multiplicity of linked sensor signals, for instance the sensor signals $24_1$, $24_2$, $24_3$ and possibly $24_4$, and to combine the multiplicity of sensor signals to compensate a static offset error of the sensor element arising in the multiplicity of linked sensor signals to obtain an overall signal, for instance the signal components φ and A, and to use the overall signal for a function implemented by the device, for example an authentication and/or the like. The test signal may furthermore be derived from at least a part of one of the multiplicity of linked sensor signals. One of the linked sensor signals $24_1$, to $24_4$ or a part thereof may thus for example be transmitted back as test signal 32.

Figure 6:
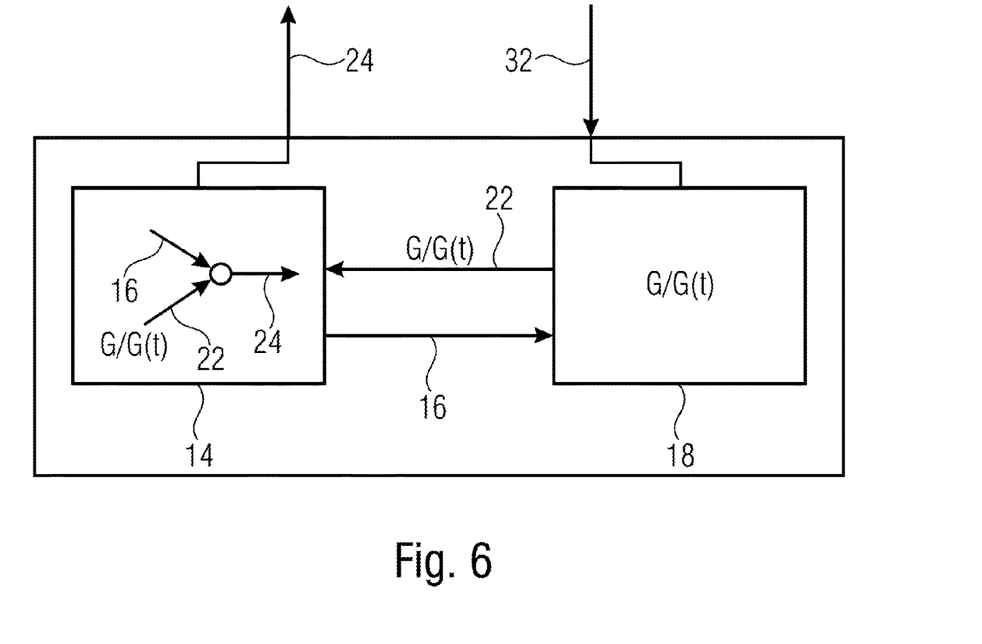
FIG. 6 shows a schematic block diagram of a sensor arrangement according to one exemplary embodiment in which a security element is designed and/or configured to provide a secret to the sensor element.

FIG. 6 shows a schematic block diagram of a sensor arrangement 60 according to one exemplary embodiment in which the security element 18 is designed and/or configured to provide the secret 22 to the sensor element 14. The secret 22 may be a secret that is constant at least over a relatively long time interval, but may also be designed and/or configured to be time-variant. The security element 18 may be designed and/or configured to store the secret 22, possibly in connection with time information that indicates when the secret 22 is and/or was valid.

The sensor element 14 is designed and/or configured to link the sensor signal 16 to the secret 22 to obtain the linked sensor signal 24 and to transmit same to the external communication partner. The undistorted sensor signal 16 may furthermore be provided to the security element 18, such that this is given the ability to link the sensor signal 16 itself to the secret 22 to obtain an accordingly corresponding version of the linked sensor signal 24 to check the test signal 32 for the presence of the secret 22. The security element 18 may obtain the test signal from the communication partner, wherein knowing both the sensor signal 16 and the secret 22 makes it possible to evaluate the authenticity of the test signal 32.

Figure 7:
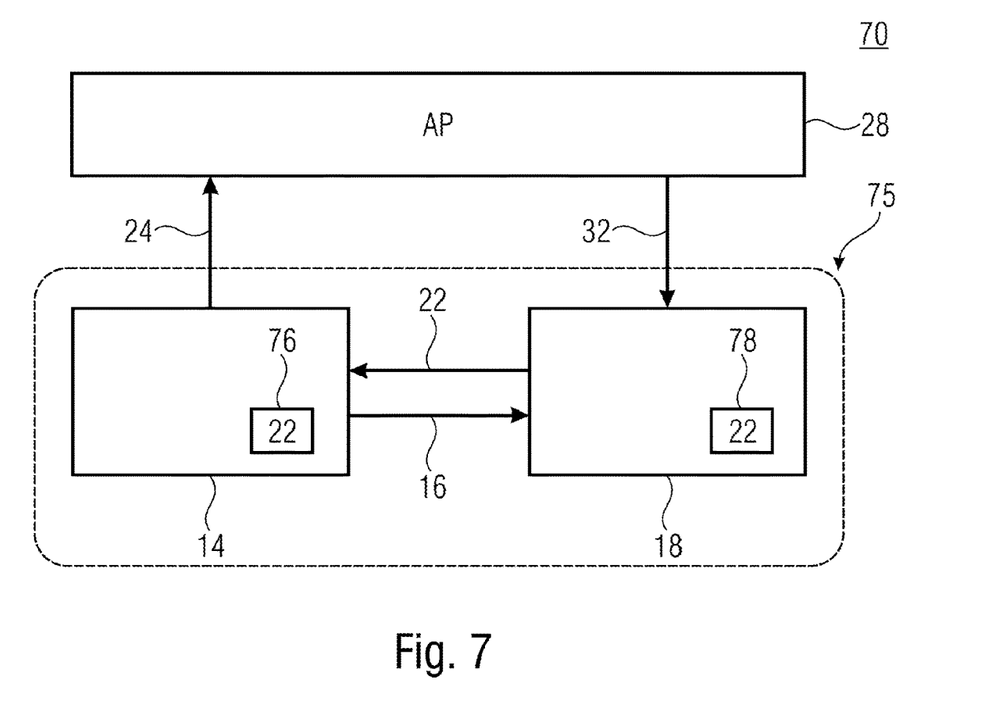
FIG. 7 shows a schematic block diagram of a sensor system according to one exemplary embodiment comprising a sensor arrangement in which the sensor element has a data memory.

FIG. 7 shows a schematic block diagram of a sensor system 70 comprising a sensor arrangement 75 that may be formed similarly or identically to the sensor arrangement 10 and has the sensor element 14 and the secure element 18. The sensor element 14 may comprise a data memory 76 that is designed and/or configured to store a secret 22 retrieved from a data memory 78 of the secure element 18 and provided to the sensor element 14 to link the sensor signal to the secret 22 to obtain the linked sensor signal 24.

The secret 22 may comprise a nonce, that is to say a pattern, a sequence of letters and/or a sequence of numbers, and may comprise time-variant validity, until it is replaced by an up-to-date pattern and/or nonce. The nonce may also be designed and/or configured to be time-invariant based on the time interval of for example 1 second, 10 seconds or 30 seconds, possibly higher values.

The sensor element 14 is designed and/or configured to link the secret, that is to say the time-variant data pattern, to the sensor signal using a preferably bijective link, to obtain the linked sensor signal 24. One example of a bijective link is for example the exclusive OR link XOR. The sensor element may be designed and/or configured to provide the sensor signal 16 to the security element 18. The security element is designed and/or configured to link the test signal to the secret 22 using the preferably identical bijective link to check the test signal 32. By virtue of the bijectivity of the link that is used, it is thereby possible to achieve a situation whereby the secret is removed again from the test signal 32, such that the comparison between sensor signal 16 and the test signal 32 from which the secret 22 is removed likewise makes it possible to draw a conclusion as to the authenticity of the sensor signal 16 and/or of the test signal 32. A different, faulty and/or missing secret in the test signal 32 leads to a deviation between the sensor signal 16 and the result that is obtained through the bijective link.

In other words, the security element 18 provides the secret to the sensor element 14. The sensor element 14 applies the secret to the raw sensor data, for example raw image data. The sensor element and/or the sensor provides the image thus obtained and provided with a watermark, such as the phase data, to the application processor 28 during the data transmission. The application processor provides the test signal, that is to say the modified image phase data as were received by the sensor, to the security element 18. The security element 18 performs the data verification. In order to ensure that the security element 18 has corresponding reference data available for verification, image sections with known and/or stable properties may be used. Such a defined pattern may be transmitted using metadata, for instance via an associated image line. The secret 22 and/or the pattern contained therein may be a global secret that is communicated and/or stored for example during the production of the sensor arrangement 75. As an alternative and/or in addition, the secret may be communicated between sensor element 14 and security element 18, for example during what is known as pairing and/or at regular or irregular time intervals. A static secret and/or static pattern may be stored for example in the sensor element 14, such as the memory 76, for example in a non-volatile memory (NVM), for instance in a flash memory and/or in a secure memory (eFuse). A time-variant pattern (nonce) may also be stored in the sensor element 14 and the security element 18.

Figure 8A:
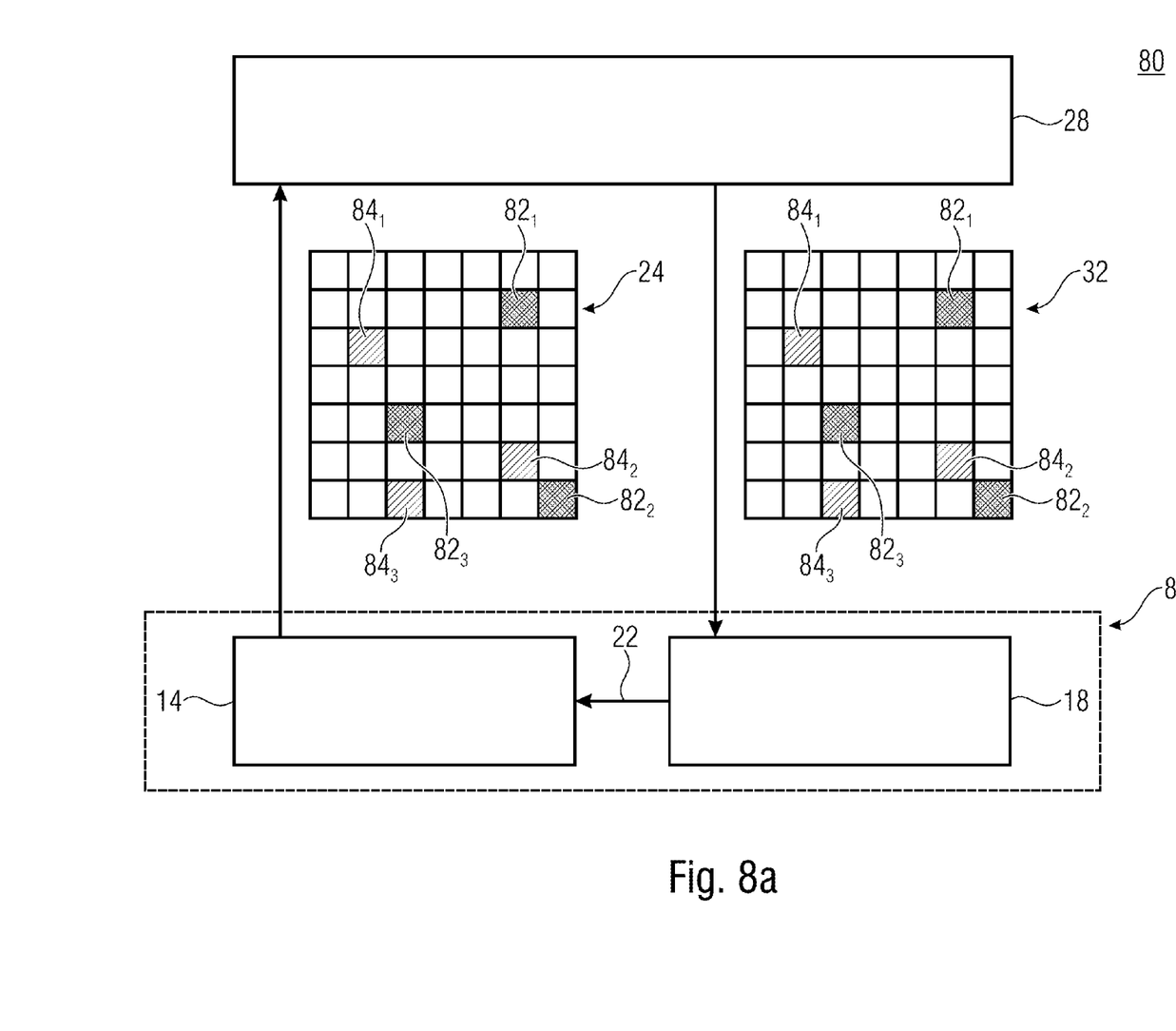
FIG. 8a shows a schematic block diagram of a sensor system according to one exemplary embodiment in which the sensor element is designed and/or configured as a sensor for generating image data.

FIG. 8*a* shows a schematic block diagram of a sensor system 80 according to one exemplary embodiment in which a sensor arrangement 85 may be formed identically or similarly to the sensor arrangement 10, that is to say the sensor arrangement 85 comprises the sensor element 14 and the security element 18. The sensor element 14 is for example designed and/or configured as a sensor for generating image data, for instance as a camera and/or fingerprint sensor and/or the like. The sensor signal 16 may be a representation of the image data generated by the sensor element 14. The secret 22 may comprise a pattern of faulty pixels (and/or a pattern of defective pixels) within the image data. The secret 22 may in this case be designed and/or configured to be static, but preferably time-variant. The sensor element 14 is designed and/or configured to generate the linked sensor signal 24 such that the image data, based on the pattern of faulty pixels, comprise an indication about defective pixels in the image data. The test signal 32 may likewise comprise image data, wherein these image data are image data to be checked. The security element 18 may be designed and/or configured to check the test signal for a match between defective pixels and the pattern of faulty pixels, the secret 22.

The sensor element 14 may thus comprise defective pixels $82_1$ to $82_3$ in an arbitrary number of ≥0 based on the state of the sensor element 14. In the image data, that is to say the sensor signal 16, these defective pixels may be able to be recognized for example as "black" and/or the like, for instance because they comprise no luminance information. As an alternative and/or in addition, a defective pixel may also be identified differently, for instance due to the fact that a high phase difference is present in relation to adjacent pixels. By contrast, the secret 22 may accordingly display pixels $84_1$, $84_2$ and/or $84_3$ in any desired number and/or in a pattern in the image data. On the basis of this, the sensor element 14 may set the image information of the corresponding pixels to a value that indicates a defect with the pixel. It is thereby not able to be recognized on the side of the external communication partner 28 whether a defective pixel in the combined sensor signal 24 is defective based on a defect with the sensor element 14 and/or based on the application of the secret 22.

The security element 18 may then check the test signal 32 to determine whether at least the pixels indicated in the secret 22 are recognizable and/or comprised as defective pixels $84_1$ to $84_3$ in the test signal 32.

Figure 8B:
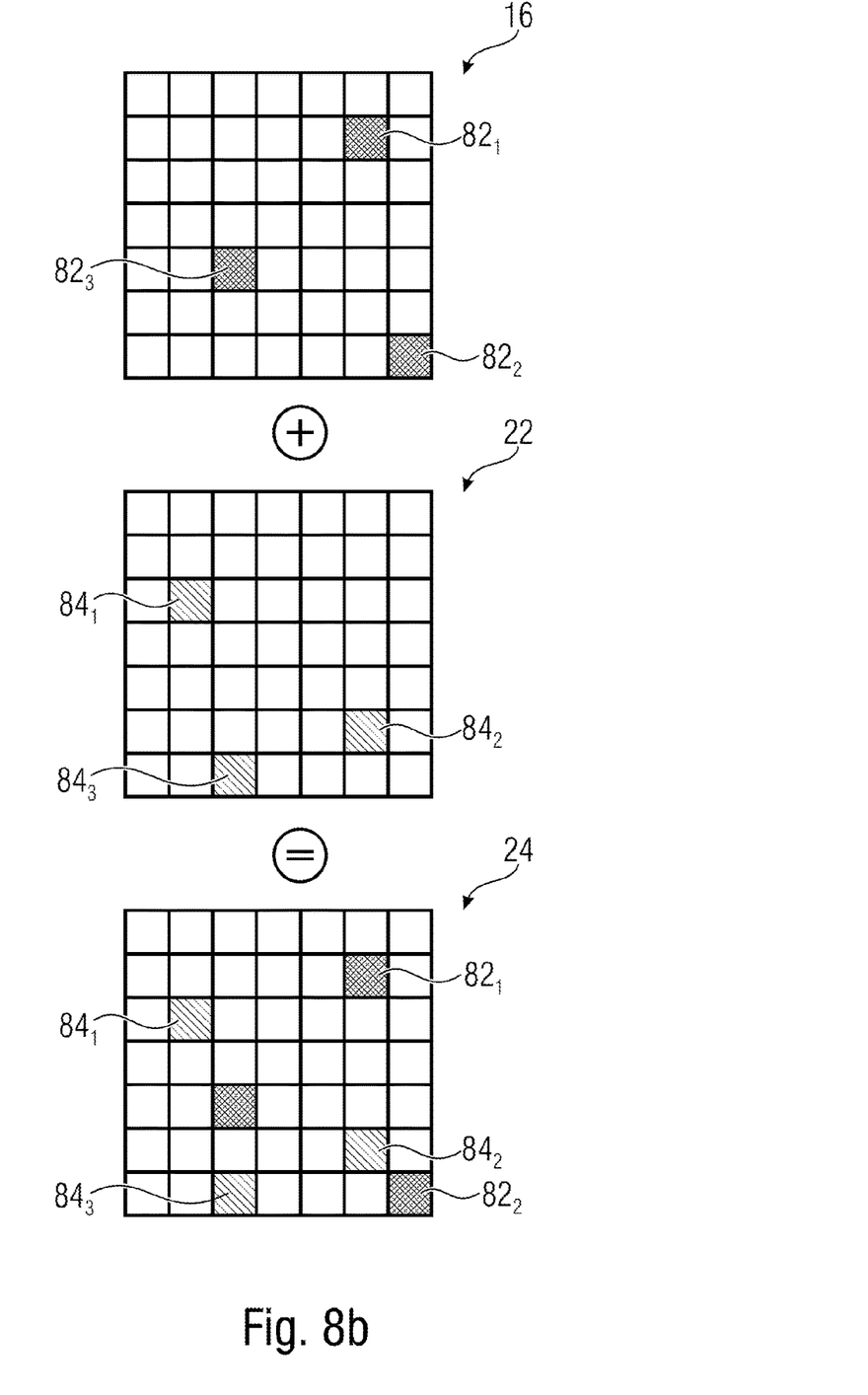
FIG. 8b shows an explanation of the concept implemented by the sensor system from FIG. 8a to overlay image data with indications about defective pixels according to one exemplary embodiment.

FIG. 8*b* shows an explanation of the concept implemented by the sensor system 80. The sensor signal 16 may comprise the actually defective pixels $82_1$ to $82_3$. These pixels may be present in a changing number over time and/or result in a random pattern.

The secret 22 may display the mentioned pattern of pixels $84_1$ to $84_3$ that are to be marked as defective. The combined sensor signal 24, based on the linking of the sensor signal 16 and of the secret 22, comprises indications about a plurality of defective pixels, specifically those that are actually defective and those that are merely indicated as being defective.

If a pixel of the pattern indicated in the secret 22 should also actually be defective, then this is not a problem for checking the signal 32, since the basis on which the pixel in the test signal 32 is defective is irrelevant to the security element 18. Both cases deliver a result of a defective pixel.

The secret 22 may represent a watermark for image information based on the defective pixels, but also based on a manipulation of the actual image information. It is pointed out that the exemplary indication of 7×7 pixels in the sensor signal 16 and the secret 22 is selected purely by way of example for explanatory purposes, and may comprise any desired number of pixels in any desired number of rows and/or columns and/or be arranged in any desired pattern.

In other words, the sensor system 80 is designed and/or configured such that the security element 18 delivers a secret mask pattern to the sensor 14. The sensor applies defective pixels and/or generates them based on the mask. The sensor provides the image data provided with the corresponding watermark to the application processor during the data transmission. The application processor provides the test signal 32, that is to say image data as are obtained by the sensor, to the security element 18. The security element 18 extracts the defective pixels based on the secret mask pattern. The security element performs the verification on the basis thereof, that is to say based on the extracted defective pixels. The background is that pixels with a high difference between phase values are considered to be defective pixels, since no depth is able to be extracted from such a pixel based thereon. In the case of high resolutions, artificial defective pixels may be generated to conceal a secret, since the application processor is not able to distinguish between real and artificial defective pixels.

Exemplary embodiments are described in connection with image data, for example those that are generated by image-based sensors, such as fingerprint sensors. The same principles may readily be applied to other sensors and/or sensor signals mentioned in this document. The test signal 32 may be checked based on whether the test signal 32 comprises the corresponding marking, that is to say the watermark. The watermark may in this case be integrated such that the secret is subtracted out again based on a predefined rule by way of which individual data are compiled, and is thus neither disruptive nor obtained in plain text. The sensor response may thereby be reconstructed. The concept of exemplary embodiments described in this document may be implemented for any correction system that removes and/or reduces artefacts, for instance the removal of offsets through differentiation and/or division. The exemplary embodiments described in this document are suitable for 3D image data, for example. Secret information may be applied to some information components as an artificial measurement defect.

Figure 9:
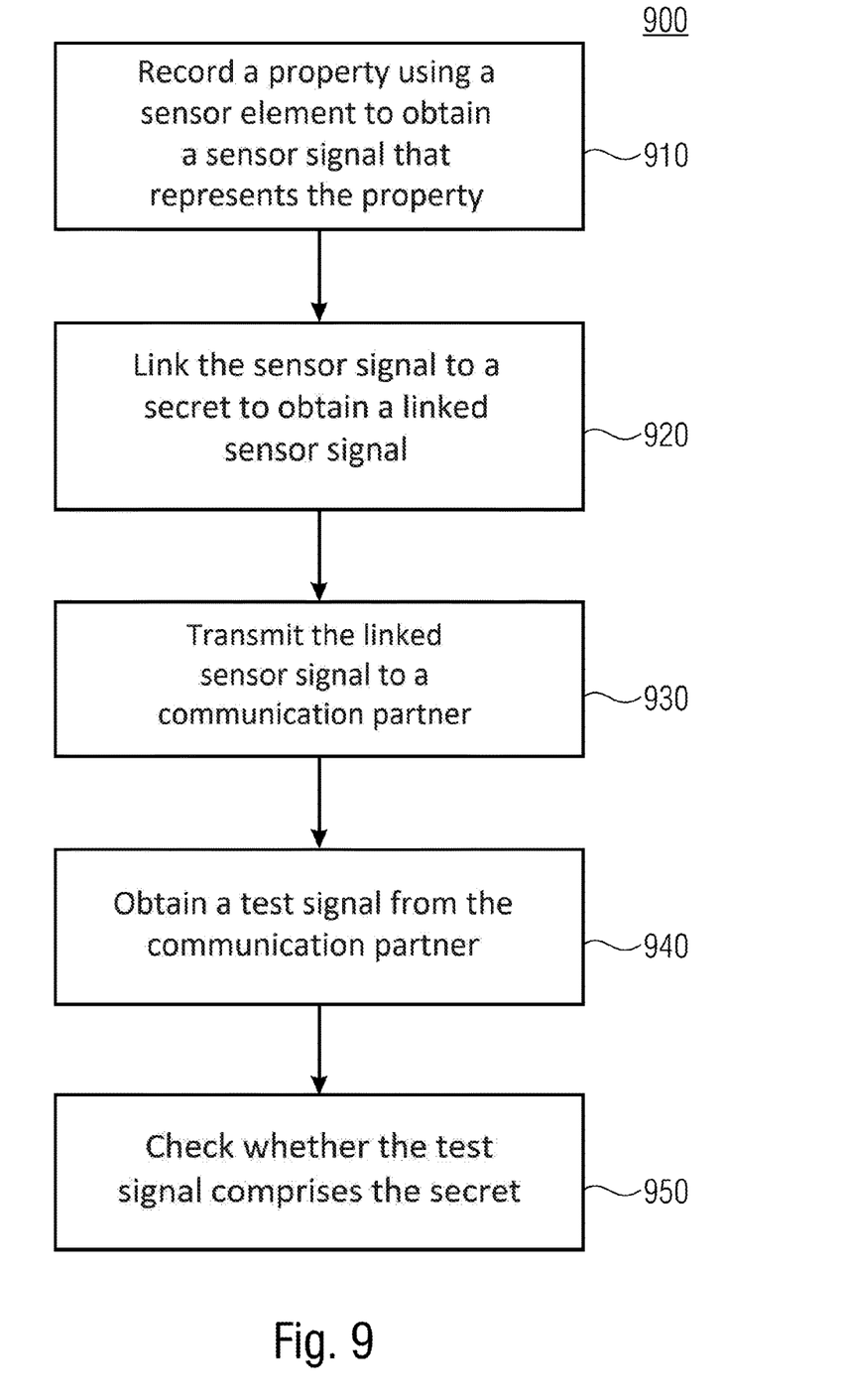
FIG. 9 shows a schematic flowchart of a method according to one exemplary embodiment.

FIG. 9 shows a schematic flowchart of a method 900 according to one exemplary embodiment. In 910, a property is recorded using a sensor element to obtain a sensor signal that represents the property. In 920, the sensor signal is linked to a secret to obtain a linked sensor signal. In 930, the linked sensor signal is transmitted to a communication partner. In 940, a test signal is obtained from the communication partner. In 950, it is checked whether the test signal comprises the secret.

Exemplary embodiments address the effect whereby an increasing number of 3D sensors are being used for biometric purposes. These include facial recognition and/or object recognition and/or fingerprint recognition and/or other biometric data. One common feature of these sensors is that data are recorded by a user and these data are transmitted to a powerful execution environment that performs the feature extraction and the pattern comparison (pattern matching). Exemplary embodiments make it possible to use such powerful execution environments even with no or low security levels. Although the data per se are thereby accessible in unchanged form for attacks, secure verification is able to take place. Exemplary embodiments in this respect allow the data themselves to be able to be processed in unsecured environments. After the post-processing in the application processor, the external communication partner 28, has been performed, and possibly a data reduction has taken place through compression, the result may be transmitted again to the secure environment to perform a further check using stored data.

Some applications, such as security-critical applications, require the authenticity of the provided data between the sensor (raw data) to the application processor (that performs the post-processing). Exemplary embodiments relate to the insertion of watermarks into image data. Although these watermarks are not immediately optically visible, they change the provided data flow.

Some of the exemplary embodiments described in this document make use of the fact that some properties of the 3D data may be used to transparently insert secrets into the data flow. As described, grayscale values and phase values of a total of four values that are recorded by a sensor may for example be calculated. In this case, exemplary embodiments make provision for differences between pairs (e.g., only differences between pairs) to be evaluated. Since the difference remains the same when the secret is inserted, the secret may be added and/or subtracted without distorting the result obtained by the link.

Exemplary embodiments make it possible for 3D data to be able to be processed transparently by the application processor, that is to say without knowledge of the secret and/or without knowledge that the secret has been applied. Exemplary embodiments may be designed and/or configured such that the security element 18 (e.g., only the security element 18), possibly the sensor 14, has awareness and/or knowledge of the secret 22. As long as the 3D data properties are not infringed, the secret may be any result of a cryptographic operation, for example a message authentication code (MAC). By way of example, corresponding bit values and/or byte values may be incorporated into at least one, several or all of the pixels and image data.

Exemplary embodiments make it possible to embed non-biometric data securely into a 3D data flow without changing the properties of the 3D data themselves. Exemplary embodiments make provision for the sensor to receive a random watermark from a secure device, for example a directly connected security element, and apply it to the sensor data, specifically such that, following the feature extraction, the watermark is still available in the extracted properties, for instance in the test signal 32, and is able to be verified there, for instance during a final pattern comparison in the embedded security element 18.

It becomes clear that a secret value that is added and/or subtracted in the pairs $A_{90}°/A_{270}°$ and $A_0°/A_{180}°$ is subtracted out during the calculation of the phase and the grayscale data. This means that the secret value has no effect on the resultant 3D image data and the result may be further processed, for instance by the application processor, as in a regular 3D image processing system. The secure element may receive selected raw data points of the biometric sensor to which the secret information has been applied and stores it in a reference (reference template) for use. The secure element instructs the application processor to transmit the modified data points that it has received from the biometric sensor. This means that the secure element knows the raw data, it knows the secret and knows the modified data points of the candidate template. The reference template may be calculated from the secret and the raw data. As long as the data are not corrupted and/or changed, the reference template is the same as the candidate template. Exemplary embodiments are based on a mechanism that makes it possible to embed secret information in a 3D data flow without disrupting the 3D data themselves.

A first aspect relates to a sensor arrangement comprising a communication device; a sensor element for recording a property and for providing a sensor signal that represents the property; a security element that is configured to provide a secret; wherein the sensor arrangement is designed and/or configured to link the sensor signal to the secret, to obtain a linked sensor signal and to transmit the linked sensor signal to a communication partner using the communication device; wherein the sensor arrangement is furthermore designed and/or configured to obtain (and/or receive) a test signal from the communication partner using the communication device and to perform a check to determine whether the test signal comprises the secret.

A second aspect in accordance with the first aspect relates to a sensor arrangement in which the security element is designed and/or configured to check the test signal to determine whether it comprises the secret.

A third aspect in accordance with the first aspect relates to a sensor arrangement that is configured to communicate a result of the check to the communication partner.

A fourth aspect in accordance with the first aspect relates to a sensor arrangement in which the security element is designed and/or configured, in the event of a positive result of the check that indicates that the test signal comprises the secret, to authorize a function to be performed by the communication partner and/or to transmit information to the communication partner.

A fifth aspect in accordance with the first aspect relates to a sensor arrangement in which the sensor signal comprises a pattern of sensor information and the secret comprises a secret pattern, wherein the sensor arrangement is designed and/or configured to overlay the pattern of sensor information with the secret pattern to obtain the linked sensor signal.

A sixth aspect in accordance with the first aspect relates to a sensor arrangement in which the sensor element is designed and/or configured to record the property multiple times to provide a multiplicity of sensor signals that are provided such that a static offset error of the sensor element arising in the multiplicity of sensor signals is able to be compensated by combining the multiplicity of sensor signals.

A seventh aspect in accordance with the sixth aspect relates to a sensor arrangement in which the sensor element is designed and/or configured to emit a corresponding number of measured signals with a phase position different from one another to obtain the multiplicity of sensor signals, wherein the sensor arrangement is configured to insert the secret into each of the multiplicity of sensor signals such that linking the multiplicity of linked sensor signals in accordance with a predetermined rule to form an overall signal to compensate the static offset error leads to the secret being eliminated in the overall signal.

An eighth aspect in accordance with the seventh aspect relates to a sensor arrangement in which the multiplicity of sensor signals are combined based on $$\varphi = \arctan\left(\frac{A_2 - A_4}{A_1 - A_3}\right)$$

-continued and $$A = \frac{\sqrt{(A_2 - A_4)^2 + (A_1 - A_3)^2}}{2}$$

wherein φ is a first component of the overall signal that indicates phase information; A is a second component of the overall signal that indicates amplitude information, and $A_1$, $A_2$, $A_3$ and $A_4$ denote combined sensor signals.

A ninth aspect in accordance with the eighth aspect relates to a sensor arrangement in which the combined sensor signals have phase increments that are equidistant to one another.

A tenth aspect in accordance with the first aspect relates to a sensor arrangement, wherein the sensor element is designed and/or configured to record the property multiple times to provide a multiplicity of sensor signals; to provide the multiplicity of sensor signals to the security element; wherein the security element is designed and/or configured to link each of the multiplicity of sensor signals to the secret to obtain a corresponding multiplicity of linked sensor signals, and to provide the multiplicity of linked sensor signals to the sensor element for transmission to the communication partner.

An eleventh aspect in accordance with the first aspect relates to a sensor arrangement, wherein the security element is designed and/or configured to provide the secret to the sensor element; wherein the sensor element is designed and/or configured to link the sensor signal to the secret and to transmit the linked sensor signal to the communication partner; wherein the security element is designed and/or configured to obtain the test signal from the communication partner.

A twelfth aspect in accordance with the eleventh aspect relates to a sensor arrangement in which the secret comprises a data pattern preferably designed and/or configured to be time-variant, wherein the sensor element is designed and/or configured to link the time-variant data pattern to the sensor signal using a bijective link to obtain the linked sensor signal and to provide the sensor signal to the security element; wherein the security element is designed and/or configured to link the test signal to the secret using the bijective link to check the test signal and to compare a link result obtained therefrom with the sensor signal.

A thirteenth aspect in accordance with the eleventh aspect relates to a sensor arrangement in which the sensor element is designed and/or configured as a sensor for generating image data, wherein the sensor signal is designed and/or configured as a representation of the image data, wherein the secret comprises a pattern, preferably designed and/or configured to be time-variant, of faulty pixels within the image data, and wherein the sensor element is designed and/or configured to generate the linked sensor signal such that the image data, based on the pattern of faulty pixels, comprises an indication about defective pixels in the image data; wherein the test signal comprises image data to be checked; wherein the security element is designed and/or configured to check the test signal for a match between defective pixels and the pattern of faulty pixels.

A fourteenth aspect in accordance with the first aspect relates to a sensor arrangement in which the property is a biometric property, preferably a three-dimensional biometric property and/or particularly preferably a fingerprint.

A fifteenth aspect in accordance with the first aspect relates to a sensor arrangement in which the sensor element is designed and/or configured to provide the sensor signal as an image signal, wherein the secret is a watermark that is combined with the image signal.

A sixteenth aspect in accordance with the first aspect relates to a sensor arrangement in which the test signal is at least a part of the linked sensor signal.

A seventeenth aspect relates to a sensor system comprising a sensor arrangement according to the first aspect and a device for using the linked sensor signal, which device is connected to the sensor device by the communication device and is designed and/or configured to obtain the linked sensor signal from the sensor arrangement; and to derive the test signal from the linked sensor signal and to transmit it to the sensor arrangement.

An eighteenth aspect in accordance with the seventeenth aspect relates to a sensor system comprising a sensor arrangement according to the first aspect in which the device for using the linked sensor signal is configured to obtain a result of a check of the test signal from the sensor arrangement and, based on the result of the check, to derive and/or determine whether content and/or a source of the linked sensor signal is authentic.

A nineteenth aspect in accordance with the seventeenth aspect relates to a sensor system, wherein the device for using the linked sensor signal is designed and/or configured to obtain a multiplicity of linked sensor signals and to combine the multiplicity of linked sensor signals to compensate a static offset error of the sensor element arising in the multiplicity of linked sensor signals to obtain an overall signal, and to use the overall signal for a function implemented by the device, and to derive the test signal from at least a part of one of the multiplicity of linked sensor signals.

A twentieth aspect in accordance with the seventeenth aspect relates to a sensor system that is designed and/or configured as a mobile apparatus, such as a mobile telephone and/or tablet computer.

A twenty-first aspect relates to a method comprising: recording a property using a sensor element to obtain a sensor signal that represents the property; linking the sensor signal to a secret to obtain a linked sensor signal; transmitting the linked sensor signal to a communication partner; obtaining a test signal from the communication partner; and checking whether the test signal comprises the secret.

Although some aspects have been described in connection with an apparatus, it is to be understood that said aspects also constitute a description of the corresponding method, with the result that a block and/or a structural element of an apparatus should also be understood to be a corresponding method act and/or a feature of a method act. Analogously herewith, aspects which were described in connection with a method act and/or as a method act also represent a description of a corresponding block and/or detail and/or feature of a corresponding apparatus.

The above-described exemplary embodiments are merely an illustration of the principles of the present disclosure. It is to be understood that modifications and variations of the arrangements and details described in this document will be obvious to others skilled in the art. For this reason, the disclosure is intended to be limited merely by the scope of protection of the following claims rather than by the specific details which have been presented on the basis of the description and the explanation of the exemplary embodiments in this document.

The invention claimed is:

1. A sensor arrangement, comprising:
a communication device;
a sensor element configured to:
   record a property; and
   provide a sensor signal that represents the property; and
a security element configured to provide a secret, wherein the sensor arrangement is configured to:
   link the sensor signal to the secret to generate a linked sensor signal;
   transmit, via a network connection, the linked sensor signal to a communication partner using the communication device of the sensor arrangement;
   obtain a test signal, from the communication partner to which the linked sensor signal was transmitted, using the communication device of the sensor arrangement; and
   perform, by the sensor arrangement that generated and transmitted, via the network connection, the linked sensor signal to the communication partner and obtained the test signal, a check to determine whether the test signal obtained from the communication partner comprises the secret, wherein the secret comprises at least one of a pattern compatible with sensor information of the sensor signal, a time-variant data pattern or a pattern of faulty pixels; and
   based on a result of the check, at least one of (i) authorize a function or (ii) authenticate at least one of content or a source of the test signal.

2. The sensor arrangement of claim 1, wherein the security element is configured to perform the check of the test signal to determine whether the test signal comprises the secret.

3. The sensor arrangement of claim 1, wherein the network connection comprises at least one of a wireless connection or a wired connection.

4. The sensor arrangement of claim 1, wherein the security element is configured to: based on the result of the check, transmit information to the communication partner.

5. The sensor arrangement of claim 1, wherein:
the sensor signal comprises a pattern of sensor information;
the secret comprises a secret pattern; and
the sensor arrangement is configured to overlay the pattern of sensor information with the secret pattern to perform the obtaining the linked sensor signal.

6. The sensor arrangement of claim 1, wherein:
the sensor element is configured to record the property multiple times to provide a multiplicity of sensor signals;
a static offset error of the sensor element arising in the multiplicity of sensor signals is compensated by combining the multiplicity of sensor signals; and
the multiplicity of sensor signals comprises the sensor signal.

7. The sensor arrangement of claim 6, wherein:
the sensor element is configured to emit a number of measured signals to obtain the multiplicity of sensor signals, wherein phase positions of the number of measured signals are different from one another;
the sensor arrangement is configured to insert the secret into each sensor signal of the multiplicity of sensor signals; and
linking a multiplicity of linked sensor signals comprising the linked sensor signal in accordance with a predetermined rule to form an overall signal to compensate the static offset error eliminates the secret in the overall signal.

8. The sensor arrangement of claim 7, wherein the multiplicity of sensor signals are combined based on $$\varphi = \arctan\left(\frac{A_2 - A_4}{A_1 - A_3}\right)$$

and $$A = \frac{\sqrt{(A_2 - A_4)^2 + (A_1 - A_3)^2}}{2}$$

wherein:
$\varphi$ is a first component of the overall signal that indicates phase information;
A is a second component of the overall signal that indicates amplitude information; and
$A_1$, $A_2$, $A_3$ and $A_4$ denote combined sensor signals.

9. The sensor arrangement of claim 8, wherein the combined sensor signals have phase increments that are equidistant to one another.

10. The sensor arrangement of claim 1, wherein:
the sensor element is configured to:
   record the property multiple times to provide a multiplicity of sensor signals comprising the sensor signal; and
   provide the multiplicity of sensor signals to the security element; and
the security element is configured to:
   link each sensor signal of the multiplicity of sensor signals to the secret to obtain a multiplicity of linked sensor signals comprising the linked sensor signal; and
   provide the multiplicity of linked sensor signals to the sensor element for transmission to the communication partner.

11. The sensor arrangement of claim 1, wherein:
the security element is configured to provide the secret to the sensor element;
the sensor element is configured to:
   link the sensor signal to the secret to perform the obtaining the linked sensor signal; and
   perform the transmitting the linked sensor signal to the communication partner; and
the security element is configured to perform the obtaining the test signal from the communication partner.

12. The sensor arrangement of claim 11, wherein:
the secret comprises a data pattern;
the data pattern is time-variant;
the sensor element is configured to link the data pattern to the sensor signal using a bijective link to perform the obtaining the linked sensor signal;
the sensor element is configured to provide the sensor signal to the security element;
the security element is configured to link the test signal to the secret using the bijective link to obtain a link result and perform the check of the test signal; and
the security element is configured to compare the link result with the sensor signal.

13. The sensor arrangement of claim 11, wherein:
the sensor element is a sensor configured to generate image data;
the sensor signal is a representation of the image data;
the secret comprises a pattern of faulty pixels within the image data;
the pattern of faulty pixels is time-variant;
the sensor element is configured to generate the linked sensor signal based on the pattern of faulty pixels;
the image data comprises an indication about defective pixels in the image data;
the test signal comprises image data; and
the security element is configured to check the test signal for a match between defective pixels and the pattern of faulty pixels.

14. The sensor arrangement of claim 1, wherein the property is a biometric property corresponding to at least one of a three-dimensional biometric property or a fingerprint.

15. The sensor arrangement of claim 1, wherein:
the sensor element is configured to provide the sensor signal as an image signal; and
the secret is a watermark that is combined with the image signal.

16. The sensor arrangement of claim 1, wherein the test signal is at least a part of the linked sensor signal.

17. A sensor system, comprising:
a sensor arrangement, comprising:
  a communication device;
  a sensor element configured to:
    record a property; and
    provide a sensor signal that represents the property; and
  a security element configured to provide a secret, wherein the sensor arrangement is configured to:
    link the sensor signal to the secret to generate a linked sensor signal;
    transmit, via a network connection, the linked sensor signal to a device, configured to use the linked sensor signal, using the communication device of the sensor arrangement;
    obtain a test signal, from the device to which the linked sensor signal was transmitted, using the communication device of the sensor arrangement; and
    perform, by the sensor arrangement that generated and transmitted, via the network connection, the linked sensor signal to the device and obtained the test signal, a check to determine whether the test signal obtained from the device comprises the secret; and
the device, wherein:
  the device is connected to the sensor element by the communication device; and
  the device is configured to:
    obtain the linked sensor signal from the sensor arrangement;
    derive the test signal from the linked sensor signal; and
    transmit the test signal to the sensor arrangement,
    wherein the secret comprises at least one of a pattern compatible with sensor information of the sensor signal, a time-variant data pattern or a pattern of faulty pixels,
    wherein at least one of:
      based on a result of the check, the sensor arrangement is configured to at least one of (i) authorize a first function or (ii) authenticate at least one of content or a first source of the test signal; or
      based on the result of the check, the device is configured to at least one of (i) authorize a second function or (ii) authenticate at least one of content or a second source of the linked sensor signal.

18. The sensor system of claim 17, wherein the device is configured to: obtain the result of the check of the test signal from the sensor arrangement.

19. The sensor system of claim 17, wherein the device is configured to:
obtain a multiplicity of linked sensor signals comprising the linked sensor signal;
combine the multiplicity of linked sensor signals to compensate a static offset error of the sensor element arising in the multiplicity of linked sensor signals to obtain an overall signal;
use the overall signal for a function implemented by the device; and
derive the test signal from at least a part of one of the multiplicity of linked sensor signals.

20. The sensor system of claim 17, wherein the sensor system is a mobile apparatus comprising at least one of a mobile telephone or a tablet computer.

21. A method, comprising:
recording a property using a sensor element to obtain a sensor signal that represents the property;
linking the sensor signal to a secret to generate a linked sensor signal using a sensor arrangement;
transmitting, via a network connection, the linked sensor signal to a communication partner using the sensor arrangement;
obtaining a test signal, from the communication partner to which the linked sensor signal was transmitted, using the sensor arrangement;
checking, by the sensor arrangement that generated and transmitted, via the network connection, the linked sensor signal to the communication partner and obtained the test signal, whether the test signal obtained from the communication partner comprises the secret, wherein the secret comprises at least one of a pattern compatible with sensor information of the sensor signal, a time-variant data pattern or a pattern of faulty pixels; and
based on a result of the check, at least one of (i) authorizing a function or (ii) authenticating at least one of content or a source of the test signal.

* * * * *